Oct. 23, 1951   W. W. CUSHMAN   2,572,013
CHUCK JAW GAUGE
Filed Nov. 28, 1947

INVENTOR.
Walton W. Cushman
BY
W. J. Eccleston,
ATTORNEY

Patented Oct. 23, 1951

2,572,013

UNITED STATES PATENT OFFICE 2,572,013

CHUCK JAW GAUGE

Walton W. Cushman, Webb City, Mo.

Application November 28, 1947, Serial No. 788,699

2 Claims. (Cl. 33—181)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates primarily to lathes of the general type in which the jaws of the chuck may be simultaneously moved inwardly or outwardly by suitable gearing to grip the work.

It is, of course, highly essential that the operative faces of the jaws of a lathe chuck be concentrically arranged with the axis of the lathe. In new lathes it is customary to accurately machine the chuck plate and center the same on the particular lathe prior to initially mounting the chuck. In lathes in which the chuck jaws have become worn or chipped and slack has developed in the threads and guides there is no simple and satisfactory apparatus or methods for returning the jaws to concentricity with the axis of the lathe.

A primary object of the present invention resides in the provision of a simple gauge or template for rigidly clamping the jaws while they are being machined or ground to provide the desired concentricity.

Another object of the invention consists in a method of accurately centering a series of chuck jaws while in position on the lathe so as to produce the desired concentricity.

Figure 1:
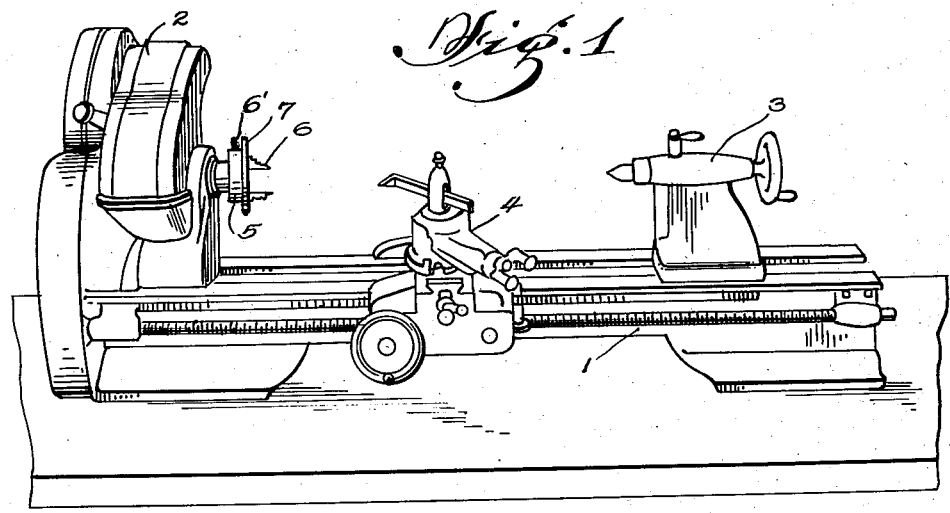

Other objects and advantages of the invention will be apparent from the following description and the attached drawings, in which Figure 1 is a fragmentary perspective view of a lathe showing the gauge installed thereon and holding the chuck jaws in position for machining.

Figure 2:
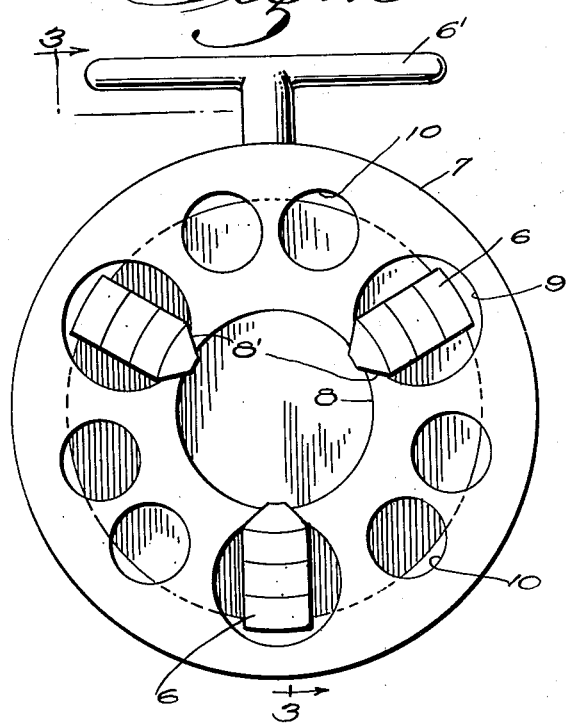
Figure 3:
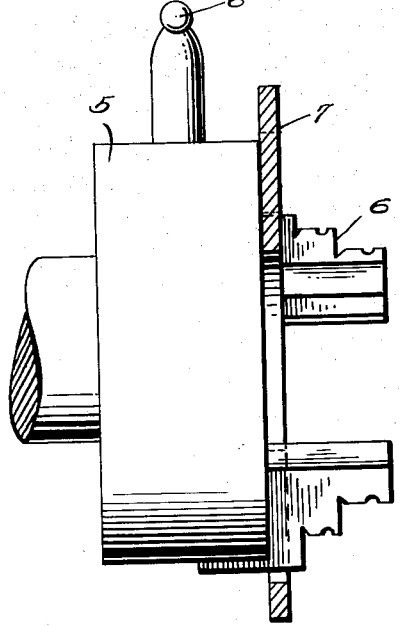

Figure 2 is a front elevational view of the jaw gauge mounted over the jaws of a chuck; and Figure 3 is a longitudinal sectional view taken on the line 3—3 of Figure 2.

Referring to the drawings more specifically, the numeral 1 indicates a lathe provided with the usual headstock 2, tailstock 3 and tool carriage 4. The chuck of this particular lathe is indicated by the numeral 5 and is provided with the usual series of three chuck jaws 6 adapted to be operated by gearing under control of the key 6'.

The gauge for limiting the inward movement of the jaws 6 is indicated by the numeral 7. This plate may be of circular or other outline but whatever its shape it is provided with a central opening 8 and a series of secondary openings 9 corresponding in number to the number of chuck jaws, there being 3 in the present illustration. These secondary or jaw-receiving openings 9 are caused to communicate with the central opening 8 by the provision of channels 8' having tapered walls to correspond with the taper on the inner ends of the chuck jaws. The plate 7 is of sufficient thickness to provide the rigidity necessary to limit the inner movement of the chuck jaws but may be reduced in weight by removing parts of the metal as illustrated by the circular openings indicated by the numeral 10.

In the operation of this device, whether it be for centering the chuck jaws of an entirely new chuck or for centering the jaws of a chuck which has been worn or chipped, the plate 7 is slipped over the jaws as indicated in the several figures with the jaws extending into the openings 9. The jaws are then adjusted inwardly by means of the key 6'. As the jaws move inwardly their tapered edges engage the tapered walls of the channels 8' and are thus limited in their inward movement. By thus forcing the jaws securely into clamping position against the walls of the channels 8' they are rigidly held in position and any slack or looseness which may have developed between the jaws and their operating means is eliminated. After being so clamped the lathe carriage 4 is moved up into position, the tool adjusted and the lathe set in operation. During this operation, of course, the chuck 5 is rotated and the faces of the chuck jaws 6 are successively brought into operative relation to the cutting or grinding tool. If one of the series of jaws is off center, that is, positioned beyond the circle in which the other jaws are located, it will not be engaged by the tool in the first passage of the tool carriage. These operations are continued in the usual manner by adjusting the position of the tool until the operative faces of the series of jaws are all concentrically arranged with respect to the lathe axis. Thereafter, of course, gauge 7 is removed and the lathe is ready for use.

From the foregoing description and the accompanying illustrations of the device, it will be apparent to those skilled in the art that I have devised a novel article and method for machining lathe chuck jaws in situ; that the article and method are extremely simple in structure and operation, and that they both very substantially reduce the time and expense involved in bringing the jaws into concentric relationship to the axis of the lathe.

I claim:

1. A gauge for a series of chuck jaws, comprising a plate provided with a central opening, a series of equally and circumferentially spaced secondary openings, and a channel connecting each opening of the series with the central opening, the walls of each channel being tapered to correspond to the taper on the inner ends of the jaws.

2. A gauge for a series of chuck jaws, comprising a plate provided with a central opening, a series of equally and circumferentially spaced secondary openings each of a size capable of encompassing a chuck jaw of a conventional lathe, said plate provided with channels connecting said central opening with each of the secondary openings, the walls of each channel being shaped to engage substantial portions of the sides of the tapered inner end of a chuck jaw.

WALTON W. CUSHMAN.

REFERENCES CITED

The following references are of record in the file of this patent:

UNITED STATES PATENTS

| Number | Name | Date |
|---|---|---|
| 192,824 | Grant | July 10, 1877 |
| 357,394 | Kirkpatrick | Feb. 8, 1887 |
| 972,575 | Schramm | Oct. 11, 1910 |
| 1,438,681 | Bath | Dec. 12, 1922 |
| 1,584,898 | Smith | May 18, 1926 |
| 1,630,690 | Bosle et al. | May 31, 1927 |
| 2,341,466 | Nardi | Feb. 8, 1944 |
| 2,376,594 | Hite | May 22, 1945 |
| 2,387,214 | Carey | Oct. 16, 1945 |
| 2,412,797 | Berliner | Dec. 17, 1946 |
| 2,433,339 | Brown | Dec. 30, 1947 |

FOREIGN PATENTS

| Number | Country | Date |
|---|---|---|
| 24,251 | Denmark | Apr. 13, 1918 |
| 312,428 | Germany | May 27, 1919 |
| 362,077 | Italy | Aug. 11, 1938 |